United States Patent [19]

Amer

[11] Patent Number: 5,311,287

[45] Date of Patent: May 10, 1994

[54] DIRECT ACCESS STORAGE DEVICE WITH HEAD-DISC DYNAMICS MONITOR

[75] Inventor: Nabil M. Amer, Armonk, N.Y.

[73] Assignee: International Business Machines Corporation, Armonk, N.Y.

[21] Appl. No.: 841,344

[22] Filed: Feb. 25, 1992

[51] Int. Cl.⁵ .............................................. G01B 11/00
[52] U.S. Cl. ................................... 356/373; 356/375; 360/103
[58] Field of Search ..................... 356/372, 373, 375; 360/75, 103

[56] References Cited

U.S. PATENT DOCUMENTS

| H1,006 | 12/1991 | Zwicke | 364/551.01 |
| 3,695,767 | 10/1972 | George et al. | 356/154 |
| 4,053,227 | 10/1977 | Bodlaj | 356/4 |
| 4,201,475 | 5/1980 | Bodlaj | 356/381 |
| 4,593,368 | 6/1986 | Fridge et al. | 364/525 |
| 5,031,055 | 7/1991 | Vanagisawa | 360/103 |
| 5,142,424 | 8/1992 | Hatamura | 360/103 |
| 5,148,415 | 9/1992 | Takeuchi | 360/103 |

FOREIGN PATENT DOCUMENTS

| 336687 | 10/1989 | European Pat. Off. | 360/75 |
| 293405 | 11/1988 | Japan | 356/373 |
| 260305 | 10/1989 | Japan | 356/373 |
| 54405 | 3/1991 | Japan | 356/373 |
| 252913 | 11/1991 | Japan | 360/75 |

Primary Examiner—F. L. Evans
Attorney, Agent, or Firm—Robert M. Trepp

[57] ABSTRACT

An apparatus and method for direct measurement for head/disc interface dynamics in a head/disc assembly is described incorporating two light beams positioned to reflect off two surfaces, two position sensitive detectors for receiving reflected light beams, and a processor for determining the displacement of the surfaces. The processor may further include circuitry for determining the change of displacement as a function of time of the two surfaces and for correlating displacement signals and change of displacement signals with themselves or with other predetermined stored signals to provide an indication of the operating status of the head/disc assembly. The invention overcomes the problem of experiencing unexpected head crashes and of predicting timely preventive maintenance of the head/disc assembly.

31 Claims, 5 Drawing Sheets

DIRECT ACCESS STORAGE DEVICE WITH HEAD-DISC DYNAMICS MONITOR

FIELD OF THE INVENTION

This invention relates to direct access storage devices and more particularly, to monitoring of head and disc dynamics in real time.

BACKGROUND OF THE INVENTION

With the ever decreasing flying distance between the head and the disc in direct access storage devices, the dynamics of the head/disc interface need to be carefully characterized in order to mitigate failures due to, e.g., head crashes and dynamic "dings". It is imperative that the information be acquired in a real time manner. Currently, information has been acquired in one of four ways: 1) Measuring variations in capacitance between the head and the disc; 2) Performing "Wearscans" where permanent information has been imprinted on each track which is read at a later time to detect changes in signal amplitude; 3) Performing "Quantitative Readback Signal" (QRS) where a sinewave signal which was written on a spin-down of the disc is measured, as a function of disc velocity, on spin-up to determine the flying height of the head; and 4) Measuring variations in acceleration of the head with piezoelectric transducers. A variation of QRS mentioned in 3 above is to take the ratio of the third and first harmonic of the signal using a phase locked loop to determine the flying height of the head. This method is called "Harmonic Ratio Flying-height Analysis" (HRF).

Limitations of these method include: susceptibility to electrical noise, particularly in the case of the capacitance approach, non-linear response of piezoelectric transducers and of the capacitance measurement methods, inaccuracy in the capacitance measurement due to inherent variation (e.g., coating imperfections) which manifests themselves as variations in the dielectric properties of the disc surface or capacitance changes that are not caused by mechanical interface properties (e.g., surface pits), and incompatibility with real time measurement as in the case of the Wearscan, the QRS and the HRF techniques.

In U.S. Pat. No. 3,695,767 which issued on Oct. 3, 1972 to D. J. George et al., an apparatus for measuring the flying angle of a pneumatically supported magnetic head relative to a recording disc is described in which a laser beam is directed toward a transparent rotating disc. A portion of the laser beam is reflected from the surface of the disc at a first angle and a portion of the laser beam passing through the disc is reflected by the surface of the flying head which is reflected at a second angle. The two reflected beams will be at an angle relative to each other which is twice the angle between the two reflecting surfaces. A screen is disclosed positioned at a distance R from the flying head which intercepts the two reflected beams. Typically, the distance R is on the order of 50 feet so that the displacement distance on the screen for typical angles of α would be a few centimeters.

In U.S. Pat. No. 4,593,368 which issued on Jun. 3, 1986 to D. A. Fridge et al., a transparent disc is substituted for the normal hard magnetic disc in a storage system, and a broad spectrum of light such as from a Xenon lamp is directed substantially normal to the surface of the transparent disc, through the disc and onto the slider supporting the flying head. The light reflected from the slider and from the surface of the disc close to the slider is combined and spectrally analyzed for constructive and destructive interference at each of a large number of wavelengths to provide a plot of intensity versus wavelength.

In U.S. Pat. No. 4,201,475 which issued on May 6, 1980 to V. Bodlaj, a system is disclosed for non-contact distance or thickness measurement using a laser and a laser beam deflector for periodically deflecting the laser beam. The deflected laser beam scans an object and produces a measuring impulse during a forward and reverse motion of the scan when the laser beam hits a reference plane and a point on an object and is reflected along a line of sight to a measuring detector which is prepositioned with respect to the object.

In U.S. Pat. No. 4,053,227 which issued on Oct. 11, 1977 to B. Bodlaj, a method and apparatus is disclosed for measuring the height of a blade of a turban rotor as the rotor is being rotated without any contact taking place. A laser beam is deflected along a given path at a known frequency of deflection, the laser beam impinges on the end of the moving blade wherein a portion of the laser beam is reflected from the end of the blade. A portion of the reflected laser beam is sensed to provide a signal, the signal and a reference signal from the laser beam is provided to an electronic analysis system to determine the height of each individual blade.

SUMMARY OF THE INVENTION

In accordance with the present invention, a method and apparatus for direct measurement of head/disc interface dynamics in a head/disc assembly is described comprising a laser for reflecting a first light beam from a first surface of the disc towards a first detector, a second laser for reflecting a second light beam from a second surface towards a second detector, the second surface having a fixed relationship with respect to the head, first circuitry for generating a first signal indicative of the change of position of the disc, and second circuitry for generating a second signal indicative of the change of position of the head.

It is an object of the invention to provide real time monitoring of head/disc interactions using information from laser beams reflected from the surfaces of a head and the disc respectively.

It is a further object of the invention to obtain data from laser beams reflected from the surfaces of a head and disc in a direct access storage device for planning preventive maintenance to forestall possible failures such as head crashes or head "dings" into the disc.

It is a further object of the invention to generate data from laser beams reflected from the surfaces of head and disc and to process the data to evaluate the sources of failure such as from head crashes and head "dings" into the disc.

It is a further object of the invention to generate data from two laser beams reflected from a head and a disc respectively in normal operation and to provide circuitry or data processing to correlate the data such as by auto-correlation and cross-correlation to determine the operating status, the performance dynamics of the head and of the disc, and the spacing therebetween.

It is a further object of the invention to provide real time dynamic monitoring of head/disc interaction using a non-intrusive optical technique having an output signal with low electrical noise and large electrical bandwidth.

It is a further object of the invention to provide a multi-sensor approach utilizing reflected laser beams, position sensitive detectors, and circuitry to perform cross-correlation which, for example, would enable relating a crash event (as detected with the head sensor) to an aerodynamic instability (as detected with the slider sensor).

It is a further object of the invention to provide a multi-sensor system incorporating reflected laser beams and respective position sensitive detectors as a diagnostic tool for head/disc interaction of head/disc assemblies during manufacturing.

It is a further object of the invention to provide reflected laser beams from the head and disc in an operating head/disc assembly to respective position sensitive detectors to provide output signals which may be monitored during routine operation and service to estimate and anticipate the failure of the head/disc assembly thus potentially avoiding or preventing catastrophic head crashes.

DESCRIPTION OF THE PREFERRED EMBODIMENT

Figure 1:
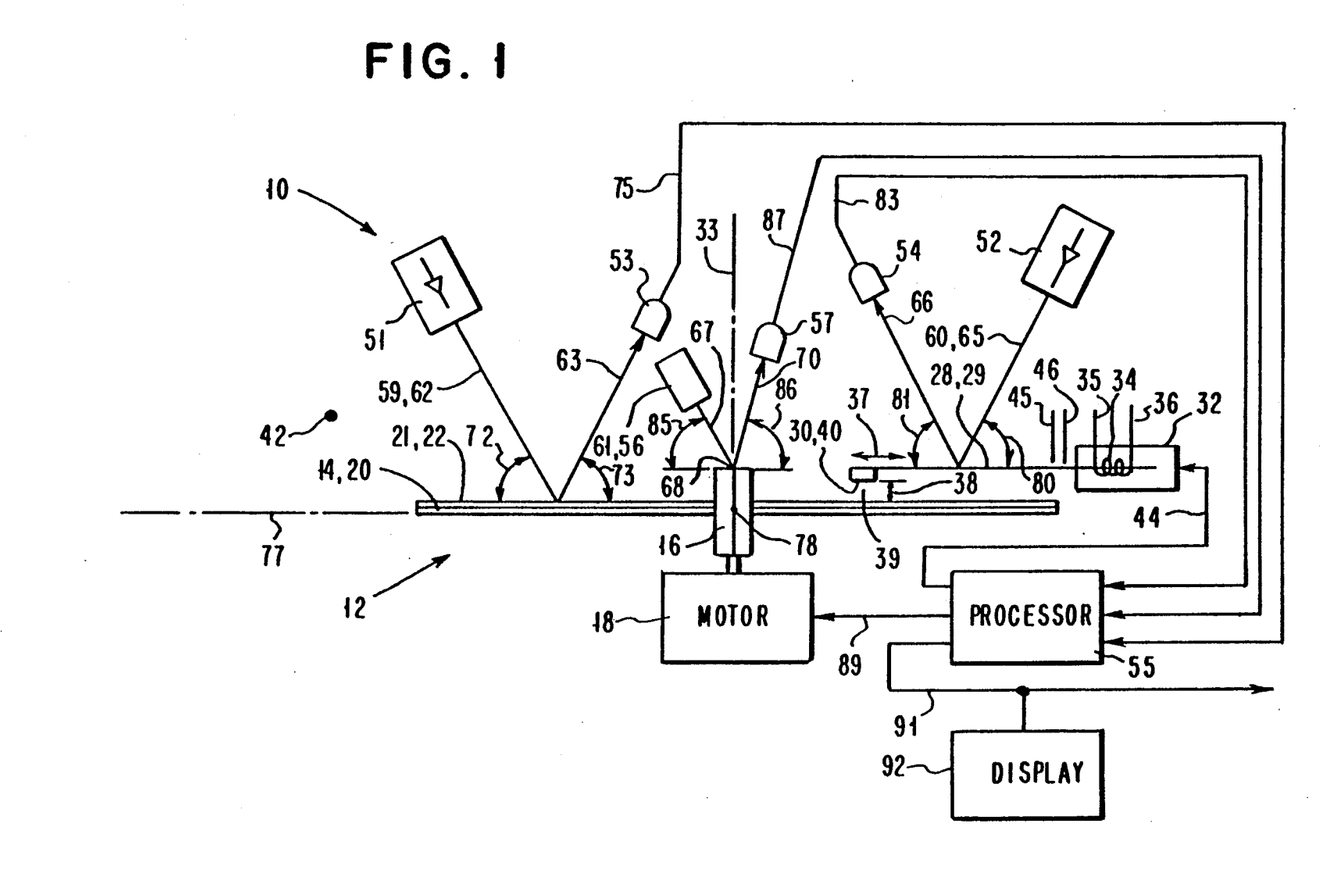
FIG. 1 is an illustration of one embodiment of the invention.

Referring now to the drawing, FIG. 1 shows a head/disc monitor 10 and a head/disc assembly 12. Head/disc assembly 12 includes a disc 14 mounted on a spindle 16 which is rotated by a motor 18. Motor 18 functions to rotate disc 14 at the appropriate speed. Spindle 16 may accommodate additional discs not shown such as, for example, 9 discs.

Disc 14 has an upper disc surface 20 which has a coating 21 having a predetermined thickness. The coating consists of magnetic particles having a predetermined particle size and a predetermined particle volume within the coating. Disc 14 may have a diameter of 27.4 centimeters (10.8 inches). Some disc diameters may be considerably smaller such as 8.9 centimeters (3.5 inches) in diameter. Coating 21 may have an upper coating surface 22. The thickness of coating 21 may have variations therein so that as disc 14 rotates the surface 22 may rise and fall as a function of the thickness of coating 21.

FIG. 1 also shows in schematic form slider arm 28, head 30 and actuator 32. Actuator 32 functions to move slider arm radially over disc 14 with respect to reference axis 33. Reference axis 33 is at the center of rotation of disc 14 and spindle 16. Actuator 32 may have a voice coil 34 for moving slider arm 28 in response to a current supplied on leads 35 and 36.

Arrow 37 shows the motion of slider arm 28. Head 30 which functions to magnetically read or write data from or into coating 22, in or along circular tracks, forms a gap 39 between the lower surface 40 of head 30 and upper surface 22 of coating 21. Arrow 38 shows the distance or spacing of gap 39. Actuator 32 includes means for allowing head 30 to rest on upper surface 22 of casing 21 or to lift head 30 by way of slider arm 28 a predetermined distance above upper surface 22 in response to a signal on lead 44. The output of head 30 indicative of write or read data may be coupled along leads on slider arm 28 to leads 45 and 46.

Head/disc monitor 10 includes lasers 51 and 52, position sensitive detectors 53 and 54 and processor 55. Additional lasers and position sensitive detectors may be coupled to processor 55. As shown in FIG. 1, laser 56 and its corresponding position sensitive detector 57 is provided.

Lasers 51, 52 and 56 may be, for example, diode lasers oscillating at 670 nM which are available commercially. Lasers 51, 52 and 56 function to provide a collimated light beam. Optical fibers 59–61 may be used to carry the light beam from lasers 51, 52 and 56, respectively. The light beam which may be coherent is directed towards a surface which reflects the light beam from the surface towards a respective position sensitive detector. Laser 51 emits a light beam 62 towards upper surface 22 of coating 21 which is reflected as light beam 63 to position sensitive detector 53. Laser 52 emits a light beam 65 towards upper surface 29 of slider arm 28 which is reflected as light beam 66 to position sensitive detector 54. Laser 56 emits a light beam 67 towards the upper surface 68 of spindle 16 which is reflected as light beam 70 to position sensitive detector 57. The angle formed between light beam 62 and upper surface 22 of coating 21, and more particularly, upper surface 20 of disc 14 is is shown by arrow 72. The angle shown by arrow 72 is also equal to the angle shown by arrow 73 of light beam 63 being reflected from upper surface 22. The change of position of light beam 63 on position sensitive detector 53 provides an output over lead 75 indicative of the displacement of upper surface 22. The output from position sensitive detector 53 on lead 75 may be referenced to two axes corresponding to deflection of disc 14 with respect to x and y axes 77 and 78, respectively.

The angle of incidence of light beam 65 on upper surface 29 of slider arm 28 is shown by arrow 80. The angle shown by arrow 80 is also equal to the angle shown by arrow 81 which corresponds to the reflected light beam 66 with respect to the upper surface 29 of slider 28. Position sensitive detector 54 provides a signal over lead 83 indicative of the displacement of upper surface 29 of slider arm 28 with respect to the, for example, x and y axes, 77 and 78.

The angle of light beam 67 on upper surface 68 of spindle 67 is shown by arrow 85. The angle shown by arrow 85 is equal to the angle of reflected beam 70 shown by arrow 86. Position sensitive detector 57 provides a signal over lead 87 indicative of the displacement of upper surface 68 with respect to x axis 77 and y axis 78. Reference axis 33 may also correspond to the z axis which is orthogonal to x axis 77 and y axis 78. The displacement signals on leads 75, 83 and 87 are coupled to respective inputs of processor 55.

Processor 55 functions to mathematically process the signals on leads 75, 83, and 87 and may perform auto-correlation or cross-correlation, for example, followed by frequency filtering and thresholding to determine normal and abnormal operation of head disc assembly 12. Examples of normal operation include spin-up, spin-down, sit-down, lift-off, time and distance for take-off, and estimate of head height with respect to the surface of disc 14. Examples of abnormal operation include out of specification parameters of the operations given above and a head ding, crash, or catastrophic crash.

Processor 55 may provide an output signal on lead 44 to actuator 32 to cause actuator 32 to lift or lower head 30 with respect to disc 14. Processor 55 may provide a signal over lead 89 to motor 18 to control the speed of motor 18 or to cause motor 18 to turn on and off. Processor 55 provides an output signal over lead 91 to provide a signal indicative of normal or abnormal operation. The output signal on lead 91 may be displayed on display 92 to provide an operator an indication of normal or abnormal operation.

Figure 2:
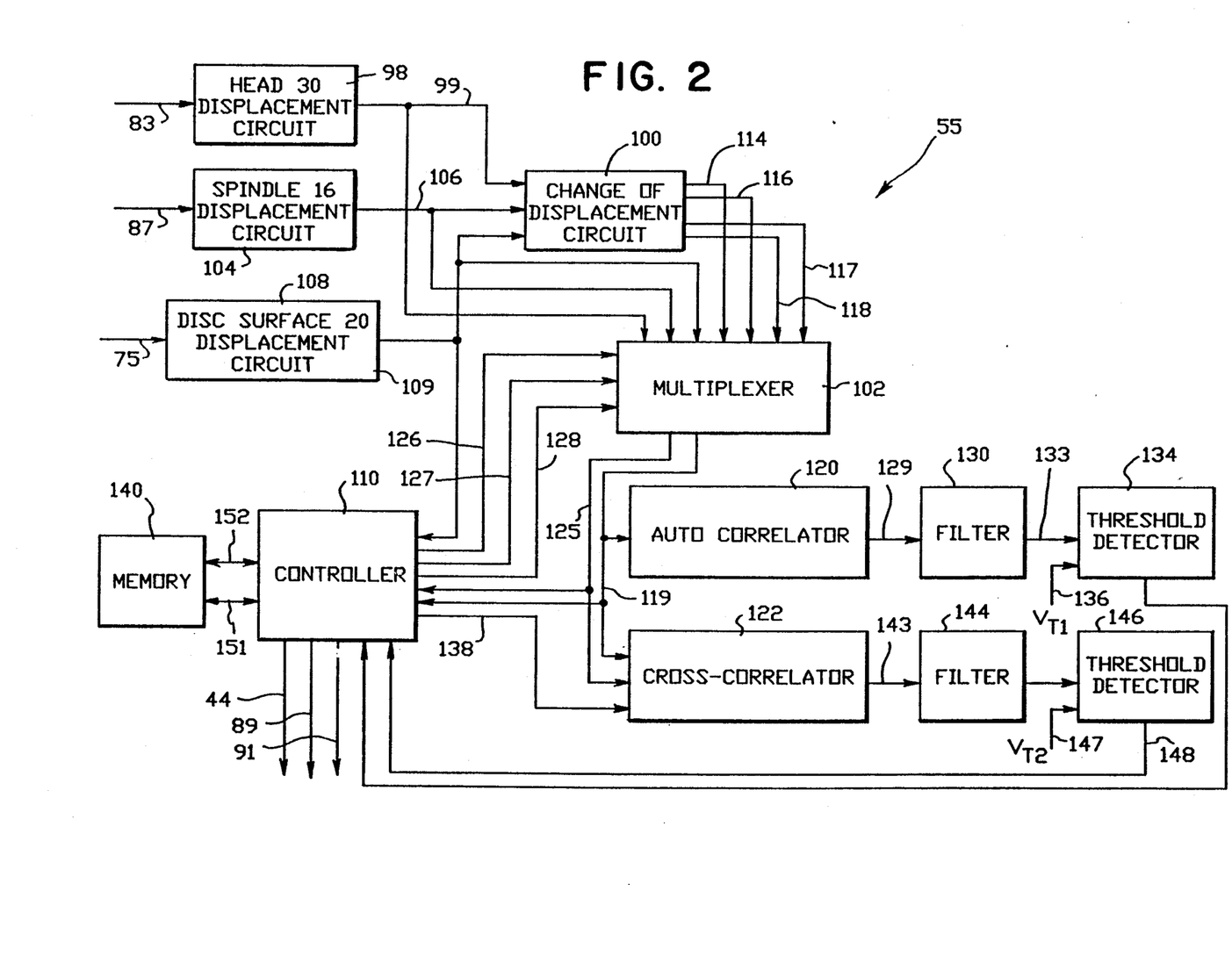
FIG. 2 is a block diagram of one embodiment of a processor suitable for use in FIG. 1.

FIG. 2 shows a block diagram of one embodiment of processor 55 shown in FIG. 1. The signal on lead 83 from position sensitive detector 54 is coupled to an input of head displacement circuit 98. Head displacement circuit 98 has an output coupled over lead 99 to an input of change of displacement circuit 100 and to an input of multiplexer 102. Head displacement circuit 98 functions to amplify the signal on 83 and convert the signal from an analog to a digital signal with an internal analog to digital converter. Head displacement circuit 98 may provide mathematical processing to provide a signal indicative of the displacement of head 30.

The signal on lead 87 from position sensitive detector 57 is coupled to an input of spindle displacement circuit 104 which has an output coupled over lead 106 to an input of change of displacement circuit 100 and an input of multiplexer 102. Spindle displacement circuit 104 functions to amplify the signal on lead 87 and to covert it from an analog to a digital signal. Spindle displacement circuit 104 may provide mathematical processing to provide a signal indicative of the actual displacement of the surface of spindle 16.

The signal on lead 75 from position sensitive detector 53 is coupled to an input of disc surface displacement circuit 108 having an output coupled over lead 109 to an input of change of displacement circuit 100, an input of multiplexer 102, and an input of controller 110. Disc surface displacement circuit 108 functions to amplify the signal on lead 75 and to convert it from an analog to a digital signal with an internal analog to digital converter. Disc surface displacement circuit 108 may provide mathematical processing to provide a signal indicative of the actual displacement of the surface of disc 14.

Change of displacement circuit 100 functions to take the difference of successive signals on lead 99 over time to provide a signal indicative of change of position (velocity) of head 30 on output lead 114. Change of displacement circuit 100 functions to determine the difference of successive signals on lead 106 to provide a signal indicative of change of position (velocity) of upper surface 68 of spindle 16 over lead 116. Change of displacement circuit 100 functions to take the difference of successive signals on lead 109 to provide a signal indicative of disc change of position (velocity) in the direction of displacement on lead 118. Change of displacement circuit 100 may process the data to provide additional signals indicative of the difference in successive velocity signals which are indicative of acceleration of the head, spindle or disc. Leads 114, 116 and 118 are coupled to respective inputs of multiplexer 102. Change of displacement circuit 100 may also subtract signals on lead 99 with respect to signals on lead 109 to provide a signal indicative of the gap between head 30 and upper surface 22 of coating 21 and, more particularly, surface 20 of disc 14. These additional signals may be coupled over lead 117 to multiplexer 102.

A first output multiplexer 102 is coupled over lead 119 to an input of auto-correlator 120, an input of cross-correlator 122 and to an input of controller 110. A second output of multiplexer 102 is coupled over lead 125 to an input of cross-correlator 122 and to an input of control 110. Controller 110 provides two control signals over leads 126 and 127 to control inputs of multiplexer 102. Multiplexer 102 functions to couple signals from leads 99, 106, 109, 114, 116, 117 and 118 to leads 119 and lead 125 in response to signals on leads 126, 127 and 128.

An autocorrelator is a correlator in which the input signal is delayed and multiplied by the undelayed signal and the result, the product, is then smoothed in a low-pass filter to give an approximate computation of the autocorrelation function.

The signal on lead 119 may be subject to autocorrelation in autocorrelator 120 having an output coupled over lead 129 to an input of a filter 130. Filter 130 may function as a low pass frequency filter to provide an output over lead 133 to an input of threshold detector 134. Threshold detector 134 may be, for example, a differential amplifier having a second input coupled to a reference voltage $V_{t1}$ on lead 136. The reference voltage may be supplied by controller 110. The output of threshold detector 134 is coupled overlead 135 to an input of controller 110. The output of threshold detector 134 on lead 135 provides a signal indicative of auto-correlation.

Auto-correlator 120 may include a memory for storing a signal received on lead 119 prior to multiplying that signal by itself or a subsequent signal on lead 119 to provide auto correlation.

A cross-correlator is a correlator in which a locally generated reference signal is multiplied by the incoming signal and the result is smoothed in a low-pass filter to give an approximate computation of the cross-correlation function.

Cross-correlator 122 functions to correlate a signal on lead 119 with either a signal on lead 125 or a signal on lead 138. The signal on lead 138 may be a signal stored in memory 140 indicative of normal or abnormal operation of head/disc assembly 12. After cross-correlating two signals, cross-correlator 122 functions to provide an output on lead 143 to an input of filter 144 which may be, for example, a low pass frequency filter. The output of filter 144 is coupled over lead 145 to an input of threshold detector 146. A second input to threshold detector 146 indicative of a threshold voltage $V_{t2}$ is coupled over lead 147 from a voltage source $v_{t2}$. The output of threshold detector 146 is coupled over lead 148 to an input of controller 110. The output of threshold detector 146 on lead 148 provides a signal indicative of cross-correlation.

Memory 140 may function to store displacement signals and change of displacement signals of head 30 and disc 14 indicative of normal and abnormal operation such as, for example, spin-up, spin-down, sit-down, lift-off, a ding, a crash, a catastrophic crash, time and distance for take-off, and an estimate of head height with respect to disc 14. Memory 140 may be a random access memory, for example, and provide and receive data over lead 151 in response to address signals over lead 152 from controller 110.

In response to signals indicative of auto-correlation or cross-correlation over leads 135 and 148 respectively, controller 110 may provide a signal over lead 91 indicative of normal or abnormal operation and further specify the nature of the abnormal operation if indeed the head/disc assembly is operating abnormally. Controller 110 may also provide a signal over lead 44 in response to the signals over leads 135 and 148 to raise or lower head 30 and to provide a signal over lead 89 to turn on or off motor 18.

Figure 3:
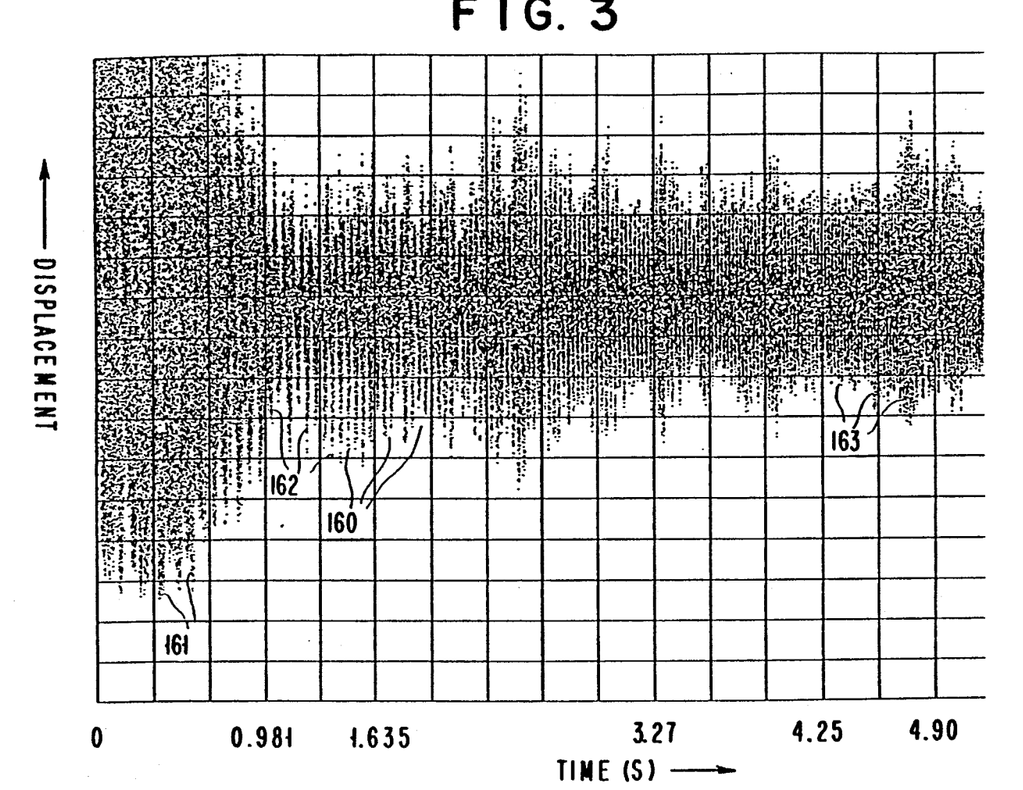
FIG. 3 is a graph of displacement versus time of a slider arm during spin-up of the disc shown in FIG. 1.

FIG. 3 is a graph of displacement versus time of slider arm 28 during spin-up of disc 14 shown in FIG. 1 when motor 18 is turned on. In FIG. 3, the ordinate represents displacement and the abscissa represents time in seconds. Curve 160 represents or shows the signal on lead 83 shown in FIG. 2. At time 0 seconds, motor 18 is turned on and head 30 is resting on upper coating surface 22 of coating 21 on disc 14. Curve portion 161 represents the maximum displacement of slider arm 28 when head 30 is resting on coating 21. At time 0.981 seconds, slider arm 28 has assumed a nominal displacement shown by curve portion 162 indicating that head 30 has lifted off upper surface 22. Curve 160 after 1.6 seconds is typical of slider arm displacement during normal operation of head/disc assembly 12. Curve portion 163 shows normal dynamic operation of head/disc assembly 12 which occurs after 4.25 seconds of the turn on of motor 18.

Figure 4:
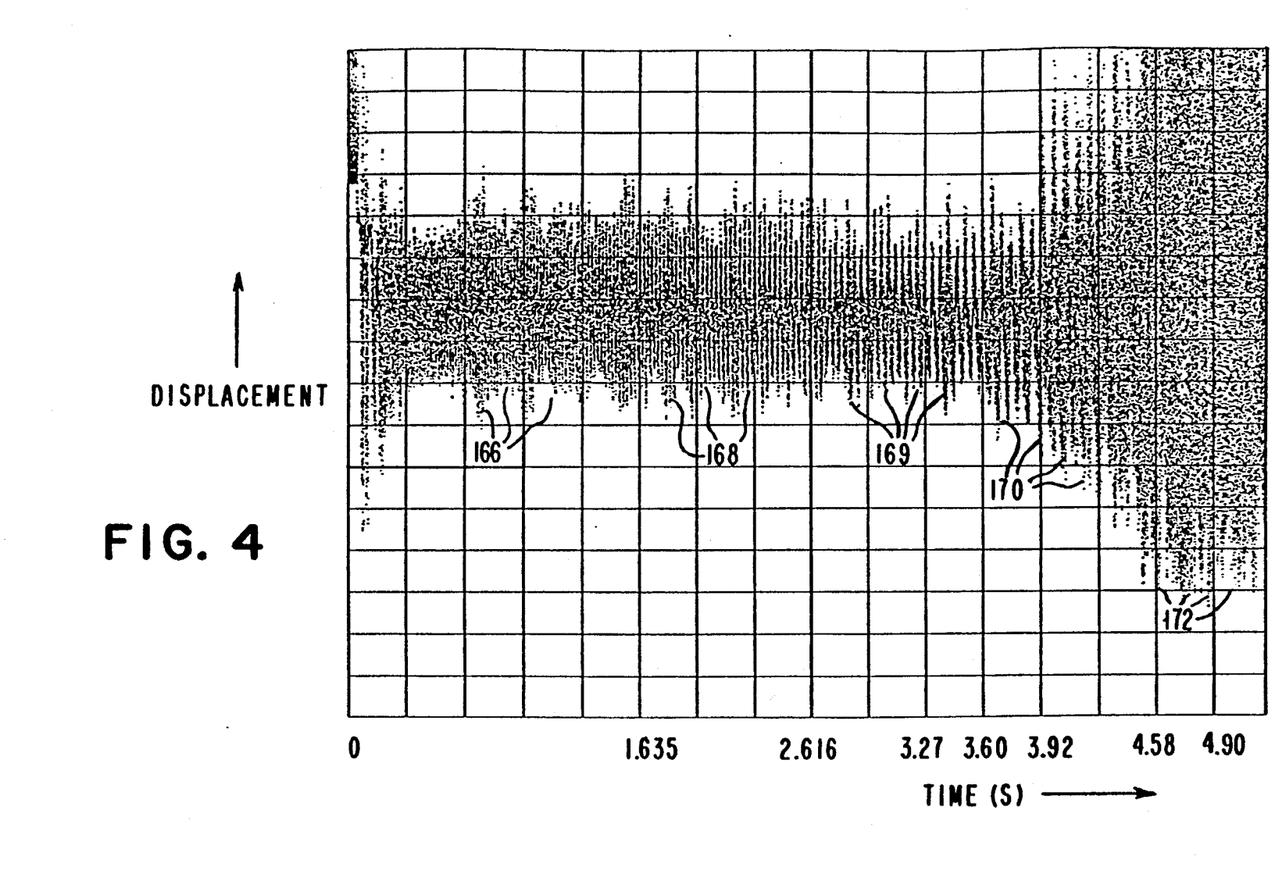
FIG. 4 is a graph of displacement versus time of a slider arm during spin-down of the disc shown in FIG. 1.

FIG. 4 is a graph of displacement versus time of slider arm 28 during spin-down of disc 14 is shown in FIG. 1 when motor 18 is turned off. Curve 166 represents the analog signal received on lead 83 shown in FIG. 2. Curve portion 168 is similar to curve portion 163 shown in FIG. 3 representing normal dynamic operation of head/disc assembly 12. At time 2.616 seconds, the displacement of slider arm 28 begins to change as shown by curve portion 169. At 3.60 seconds as shown by curve portion 170, the displacement of slider arm 28 begins to increase and approach disc 14. Head 30 at the end of slider arm 28 approaches upper surface 22 of coating 21 on disc 14. The gap shown by arrow 38 in FIG. 1 decreases. At 4.58 seconds, slider arm 28 has displaced to a maximum amount indicating that head 30 is in contact with and touching on upper surface 22 of coating 21 on disc 14 indicative of spin-down.

Figure 5:
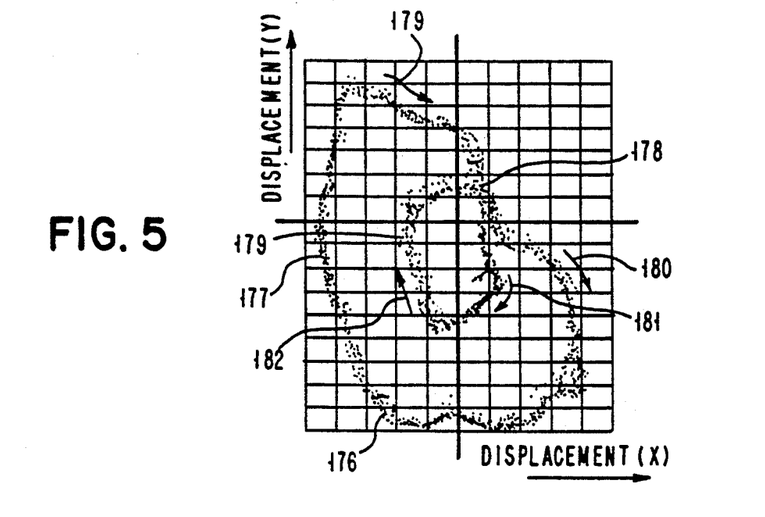
FIG. 5 is a graph, over time, of reflected laser beams from a disc arriving at a position sensitive detector during normal operation.

FIG. 5 is a graph of reflected laser beam 66 over time impinging on position sensitive detector 54 during normal operation of head/disc assembly 12. In FIG. 5, the ordinate represents displacement in the y direction and the abscissa represents displacement in the x direction. Curve 176 shown the locus of points during many revolutions of disc 14 when the output of position sensitive detector 53 on lead 83 is sampled at the rate, for example, of 3000 hertz corresponding to 50 samples per revolution of disc 14. As can be seen in FIG. 5, curve 176 forms an outer loop portion 177 and an inner loop portion 179. Curve portions 177 and 179 cross one another at point 178. Further, curve 176 is a closed curve wherein sample points are believed to be taken along the outer loop shown by arrows 179 and 180 and at point 178 continue on the inner loop 179 shown by arrows 181 and 182. The sample points are believed to cross at point 178 to resume in the same direction on outer loop portion 177.

Figure 6:
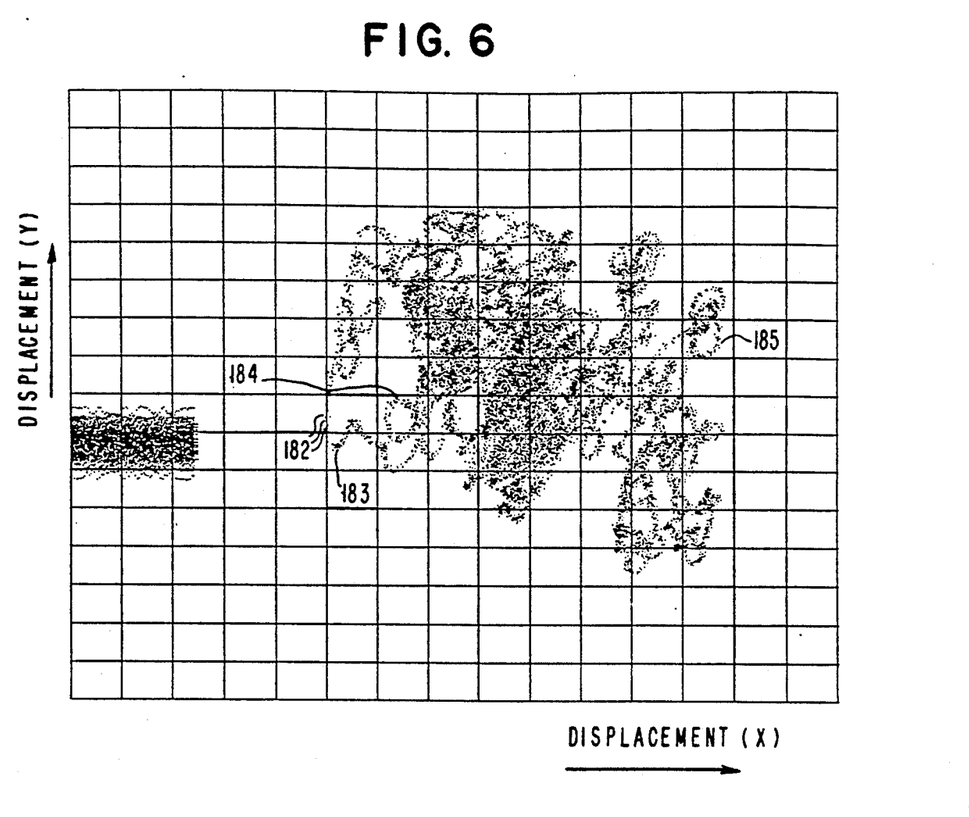
FIG. 6 is a graph, over time, of reflected laser beams received from a disc at a position sensitive detector during abnormal operation, a head crash event.

FIG. 6 is a graph of reflected laser beam 66, over time, impinging on position sensitive detector 54 during abnormal operation of head/disc assembly 12. The abnormal operation in FIG. 6 corresponds to a head crash event where head 30 has been impinged on or struck the surface 22 of coating 21 on disc 14. In FIG. 6, the ordinate represents displacement in the y direction and the abscissa represents displacement in the x direction. FIG. 6 corresponds to the analog signal on line 83 which is sampled, for example, at the rate of 3000 hertz corresponding to 50 samples per revolution where disc 14 is rotating at 3600 RPM.

In FIG. 6, a locus of points 182 are shown which form a curve 183. Curve 183 tends to form tight circles or loops as shown, for example, by curve portion 184 and 185. Curve 183 tends to meander chaotically and is distinctly different than the continuous arcing paths or curve 176 shown in FIG. 5.

The displacement of slider arm 28 to provide curve 176 in FIG. 5 and curve 183 in FIG. 6 is due to the aerodynamic and mechanical forces. The aerodynamic forces are due to the fact that the ambient atmosphere within head/disc assembly 14 is affected by the rotating disc 14, stationary head 30, and slider arm 28 to cause movement and turbulence in the ambient atmosphere 42. Curves 176 in FIG. 5 and 183 in FIG. 6 may be stored in memory 140 and used for subsequent cross-correlation in cross-correlator 122 shown in FIG. 2. Further, curve 176 in FIG. 5 will provide a different auto-correlation from auto-correlator 120 then curve 183 shown in FIG. 6. The output of auto-correlator 120 and cross-correlator 122 enables controller 110 to distinguish normal operation as represented by FIG. 5 and abnormal operation as represented by the data in FIG. 6.

In this manner, displacement curves representative of spin-up, spin-down, sit-down, lift-off, a ding, a crash, a catastrophic crash, time and distance for take-off, and estimates of head height may be stored in memory 140 for use and cross-correlation in cross-correlator 122 to identify the normal and abnormal operation of head/-disc assembly 12.

Having thus described my invention, what I claim as new and desire to secure by Letters Patents is:

1. An apparatus for measurement of head/disk dynamics in a head/disc assembly comprising:
    first means for reflecting a first light beam from a first surface of said disc towards a first detector,
    second means for reflecting a second light beam from a second surface towards a second detector, said second surface having a fixed relationship with respect to said head,
    third means for generating a first signal indicative of the displacement of said disc,
    fourth means for generating a second signal indicative of the displacement of said head whereby the displacement of said head and disc are measured,
    a memory for storing displacement signals indicative of normal and abnormal operation selected from the group consisting of spin-up, spin-down, sit-down, lift-off, ding, crash, catastrophic crash, time and distance for take-off, and an estimate of head height, and
    fifth means for correlating said stored signals with said first and second signals to identify the normal and abnormal operation of said head/disc assembly.

2. The apparatus of claim 1 wherein said first means includes a laser.

3. The apparatus of claim 1 wherein said second means includes a laser.

4. The apparatus of claim 2 wherein said laser includes a diode laser operable to generate said first light beam at 670 nm.

5. The apparatus of claim 1 wherein said first detector includes a position sensitive detector.

6. The apparatus of claim 1 wherein said second detector includes a position sensitive detector.

7. The apparatus of claim 1 wherein said third means includes an amplifier.

8. The apparatus of claim 1 wherein said fourth means includes an amplifier.

9. The apparatus of claim 1 further including fifth means for rotating said disc about an axis wherein said first surface is moving underneath said head due to the rotation of said disc.

10. The apparatus of claim 1 wherein said second surface is on an arm attached to said head.

11. The apparatus of claim 1 in combination with a direct access storage device, said disc, said head and said second surface being components thereof.

12. An apparatus for measurement of head/disk dynamics in a head/disc assembly comprising:
   first means for reflecting a first light beam from a first surface of said disc towards a first detector,
   second means for reflecting a second light beam from a second surface towards a second detector, said second surface having a fixed relationship with respect to said head,
   third means for generating a first signal indicative of the displacement of said disc,
   fourth means for generating a second signal indicative of the displacement of said head whereby the displacement of said head and disc are measured,
   a memory for storing change of displacement signals as a function of change in time indicative of displacement velocity in normal and abnormal operation selected from the group consisting of spin-up, spin-down, sit-down, lift-off, a ding, a crash, a catastrophic crash, time and distance for take-off, and an estimate of head height,
   fifth means coupled to said first signal for generating a third signal indicative of the displacement velocity of said disc, and
   sixth means for correlating said stored signals with said third signal to identify the normal and abnormal operation of said head/disc assembly.

13. An for measurement of head/disk dynamics in a head/disc assembly comprising:
   first means for reflecting a first light beam from a first surface of said disc towards a first detector,
   second means for reflecting a second light beam from a second surface towards a second detector, said second surface having a fixed relationship with respect to said head,
   third means for generating a first signal indicative of the displacement of said disc,
   fourth means for generating a second signal indicative of the displacement of said head whereby the displacement of said head and disc are measured,
   a memory for storing change of displacement signals as a function of change in time indicative of displacement velocity in normal and abnormal operation selected from the group consisting of spin-up, spin-down, sit-down, lift-off, a ding, a crash, a catastrophic crash, time and distance for take-off, and an estimate of head height,
   fifth means coupled to said first signal for generating a third signal indicative of the displacement velocity of said head, and
   sixth means for correlating said stored signals with said third signal to identify the normal and abnormal operation of said head/disc assembly.

14. An apparatus for indicating normal and abnormal operation of a head in a head/disc assembly comprising:
   first means for reflecting a first light beam from a first surface towards a first detector,
   said first surface having a fixed relationship with respect to said head,
   second means for generating a first signal indicative of the displacement of said head, and
   third means for performing auto-correlation on said first signal to provide a second signal indicative of normal and abnormal operation of said head at respective times.

15. An apparatus for indicating normal operation of a head in a head disc assembly comprising:
   first means for reflecting a first light beam from a first surface towards a first detector,
   said first surface having a fixed relationship with respect to said head,
   second means for generating a first signal indicative of the displacement of said head,
   third means for storing signal representative of said first signal at times said head is operating normally in said head/disc assembly, and
   fourth means for cross-correlating said first signal with said second signal to provide a third signal indicative of normal operation of said head.

16. An apparatus for measurement of head/disk dynamics in a head/disc assembly comprising:
   first means for reflecting a first light beam from a first surface of said disc towards a first detector,
   second means for reflecting a second light beam from a second surface towards a second detector, said second surface having a fixed relationship with respect to said head,
   third means for generating a first signal indicative of the displacement of said disc,
   fourth means for generating a second signal indicative of the displacement of said head whereby the displacement of said head and disc are measured, and
   fifth means coupled to said third means for generating a third signal indicative of velocity of said disc transverse to its plane of intended of rotation.

17. The apparatus of claim 16 further including sixth means coupled to said fifth means for generating a fourth signal indicative of acceleration of said disc transverse to its plane of intended rotation.

18. A method for measurement of head/disc interface dynamics in a head/disc assembly comprising the steps of:
   first reflecting a first light beam from a first surface of said disc towards a first detector,
   second reflecting a second light beam from a second surface towards a second detector, said second surface having a fixed relationship with respect to said head,
   third generating a first signal indicative of the change of position of said disc,
   fourth generating a second signal indicative of the change of position of said head whereby the displacement of said head and disc are measured, storing displacement signals indicative of normal and abnormal operation selected from the group consisting of spin-up, spin-down, sit-down, lift-off, ding, crash, catastrophic crash, time and distance for take-off, and an estimate of head height, and correlating said stored signals with said first and second signals to identify the normal and abnormal operation of said head/disc assembly.

19. An apparatus for indicating normal operation of a disc in a head/disc assembly comprising:

first means for reflecting a first light beam from a first surface of said disc towards a first detector, second means for generating a first signal indicative of the displacement of said disc, third means for generating a second signal indicative of the displacement of said disc during normal operation, and fourth means for correlating said first signal with said second signal.

20. The apparatus of claim 19 wherein said first means includes a laser.

21. The apparatus of claim 20 wherein said laser includes a diode laser operable to generate said first light beam at 670 nm.

22. The apparatus of claim 19 wherein said first detector includes a position sensitive detector.

23. The apparatus of claim 19 wherein said second means includes an amplifier and an analog to digital converter.

24. The apparatus of claim 19 further including fifth means for rotating said disc about an axis wherein said first surface is moving underneath said head due to the rotation of said disc.

25. The apparatus of claim 19 further including a memory for storing a plurality of said second signals indicative of normal and abnormal operation selected from the group consisting of spin-up, spin-down, ding, crash, and catastrophic crash, whereby said fourth means for correlating said second signals with said first signal functions to identify the normal and abnormal operations of said head/disc assembly.

26. The apparatus of claim 19 further including a memory for storing change of second signals as a function of change in time indicative of displacement velocity in normal and abnormal operation selected from the group consisting of spin-up, spin-down, a ding, a crash, and catastrophic crash, fifth means coupled to said first signal for generating a third signal indicative of the displacement velocity of said disc, and sixth means for correlating said stored signals with said third signal to identify the normal and abnormal operation of said head/disc assembly.

27. An apparatus for indicating abnormal operation of a disc in a head/disc assembly comprising:

first means for reflecting a first light beam from a first surface of said disc towards a first detector, second means for generating a first signal indicative of the displacement of said disc, and third means for performing auto-correlation on said first signal to provide a second signal indicative of abnormal operation of said disc.

28. An apparatus for indicating normal operation of a disc in a head/disc assembly comprising:

first means for reflecting a first light beam from a first surface of said disc towards a first detector, second means for generating a first signal indicative of the displacement of said disc, third means for storing a second signal representative of said first signal at times said disc is operating normally in said head/disc assembly, and fourth means for cross-correlating said first signal with said second signal to provide a third signal indicative of normal operation of said disc.

29. An method for indicating normal operation of a disc in a head/disc assembly comprising the steps of:

first reflecting a first light beam from a first surface of said disc towards a first detector, second generating a first signal indicative of the change of position of said disc, third generating a second signal indicative of said disc during normal operation, and fourth correlating said first signal with said second signal.

30. A method for measurement of head/disc interface dynamics in a head/disc assembly comprising the steps of:

first reflecting a first light beam from a first surface of said disc towards a first detector, second reflecting a second light beam from a second surface towards a second detector, said second surface having a fixed relationship with respect to said head, third generating a first signal indicative of the change of position of said disc, fourth generating a second signal indicative of the change of position of said head whereby the displacement of said head and disc are measured, storing change of displacement signals as a function of change in time indicative of displacement velocity in normal and abnormal operation selected from the group consisting of spin-up, spin-down, sit-down, lift-off, a ding, a crash, a catastrophic crash, time and distance for take-off, and an estimate of head height, generating a third signal indicative of the displacement velocity of said disc, and correlating said stored signals with said third signal to identify the normal and abnormal operation of said head/disc assembly.

31. A method for measurement of head/disc interface dynamics in a head/disc assembly comprising the steps of:

first reflecting a first light beam from a first surface of said disc towards a first detector, second reflecting a second light beam from a second surface towards a second detector, said second surface having a fixed relationship with respect to said head, third generating a first signal indicative of the change of position of said disc, fourth generating a second signal indicative of the change of position of said head whereby the displacement of said head and disc are measured, storing change of displacement signals as a function of change in time indicative of displacement velocity in normal and abnormal operation selected from the group consisting of spin-up, spin-down, sit-down, lift-off, a ding, a crash, a catastrophic crash, time and distance for take-off, and an estimate of head height, generating a third signal indicative of the displacement velocity of said head, and correlating said stored signals with said third signal to identify the normal and abnormal operation of said head/disc assembly.

* * * * *